(12) United States Patent
Ehara

(10) Patent No.: US 9,621,820 B2
(45) Date of Patent: Apr. 11, 2017

(54) IMAGE PROJECTION APPARATUS, IMAGE PROJECTION METHOD, AND COMPUTER-READABLE STORAGE MEDIUM

(71) Applicant: Mikinori Ehara, Kanagawa (JP)

(72) Inventor: Mikinori Ehara, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/536,717

(22) Filed: Nov. 10, 2014

(65) Prior Publication Data

US 2015/0146047 A1   May 28, 2015

(30) Foreign Application Priority Data

Nov. 22, 2013 (JP) ................ 2013-242246

(51) Int. Cl.
| | |
|---|---|
| *H04N 5/222* | (2006.01) |
| *H04N 5/265* | (2006.01) |
| *H04N 9/31* | (2006.01) |
| *G03B 17/54* | (2006.01) |

(52) U.S. Cl.
CPC .......... *H04N 5/265* (2013.01); *G03B 17/54* (2013.01); *H04N 9/3185* (2013.01); *H04N 9/3194* (2013.01)

(58) Field of Classification Search
CPC ...... H04N 5/74; H04N 9/3194; H04N 9/3185; H04N 5/265; G03B 17/54
USPC ............ 348/333.1, 333.01–333.05, 333.11, 348/333.12
See application file for complete search history.

(56) References Cited

U.S. PATENT DOCUMENTS

| | | | |
|---|---|---|---|
| 6,753,907 B1 | 6/2004 | Sukthankar et al. | |
| 2009/0245682 A1* | 10/2009 | Imai | G06T 5/006 382/275 |
| 2012/0062855 A1* | 3/2012 | Todoroki | H04N 9/3185 353/69 |
| 2013/0314388 A1* | 11/2013 | Oda | G03B 21/53 345/207 |

FOREIGN PATENT DOCUMENTS

| | | |
|---|---|---|
| JP | 2007264405 A | 10/2007 |
| JP | 2009049862 A | 3/2009 |
| JP | 2010128102 A | 6/2010 |
| JP | 2012-199772 | 10/2012 |
| JP | 2013-042411 | 2/2013 |

OTHER PUBLICATIONS

Extended European Search Report dated Jun. 24, 2015.

* cited by examiner

*Primary Examiner* — Yogesh Aggarwal
(74) *Attorney, Agent, or Firm* — Harness, Dickey & Pierce, P.L.c.

(57) ABSTRACT

An image projection apparatus includes a projection unit that projects a pattern image on a projection surface; an image capturing unit that captures the projected pattern image; and a corrector that corrects the captured image so that an imaging distortion caused due to image capturing and a projection distortion caused due to projection are corrected. The projection unit projects the corrected captured image at a predetermined position on the projection surface.

12 Claims, 7 Drawing Sheets

IMAGE PROJECTION APPARATUS, IMAGE PROJECTION METHOD, AND COMPUTER-READABLE STORAGE MEDIUM

CROSS-REFERENCE TO RELATED APPLICATION

The present application claims priority to and incorporates by reference the entire contents of Japanese Patent Application No. 2013-242246 filed in Japan on Nov. 22, 2013.

BACKGROUND OF THE INVENTION

1. Field of the Invention

The present invention relates to an image projection apparatus, an image projection method, and a computer-readable storage medium.

2. Description of the Related Art

In an image projection apparatus such as a projector, there arises a distortion of a trapezoidal shape in a projection image which is projected on a projection surface by the image projection apparatus when an inclination angle between the image projection apparatus and the projection surface of a screen and the like is misaligned from a predetermined angle.

Since a focal point distance is short especially in an image projection apparatus which is referred to as "ultra short throw projector" and whose focal point distance is shortened more than conventional techniques, even a slight misalignment in inclination angle causes a significant distortion in a projection image.

For a solution for example, known has been such a technique that an image projection apparatus projects a projection image onto a projection surface, captures the projected projection image by an imaging device such as a camera, calculates correction data for correcting a distortion arising in the projection image based on the captured image, corrects the projection image with the calculated correction data, and projects the corrected projection image onto the projection surface.

However, there is a concern about degradation in image quality such as a lack of partial information of a projection image since it is general in such a technique as explained above to perform image processing such as an image compression and an image expansion in correcting the projection image with correction data.

To deal with this concern, disclosed in Japanese Laid-open Patent Publication No. 2012-199772 is a technique in which an image projection apparatus projects a pattern image onto a projection surface, captures the projected pattern image by an imaging device such as a camera, calculates a movement amount of the image projection apparatus to a position where no misalignment in inclination angle arises based on a gap between the captured image and the pattern image, and displaying the calculated movement amount, for example.

The technique disclosed in Japanese Laid-open Patent Publication No. 2012-199772, however, requires checking that the image projection apparatus is moved for the calculated movement amount, thereby requiring separate measurement equipment that measures the movement amount of the image projection apparatus and resulting in cost increase.

Besides, since most image projection apparatuses whose focal point distance is short like the ultra short throw projector generally project an image backward at an upper part of the apparatus, a user is to perform a positional adjustment of the image projection apparatus while looking up at the pattern image from below. In this case, a direction of a line of sight of the user is not perpendicular to a plane of the pattern image and the pattern image seen by the user shows a particular distortion, so that the user is not able to determine whether or not the distortion, caused by the misalignment of the inclination angle, of the pattern image is resolved without moving to a position from which the user is able to look over an entirety of the pattern image and at which the line of sight of the user becomes perpendicular to the plane of the pattern image, and takes extra efforts.

Therefore, there is a need for an image projection apparatus, an image projection method, and a computer-readable storage medium which enable a positional adjustment of an image projection apparatus that resolves a distortion in a projection image without extra cost and efforts.

SUMMARY OF THE INVENTION

It is an object of the present invention to at least partially solve the problems in the conventional technology.

According to an embodiment, there is provided an image projection apparatus that includes a projection unit that projects a pattern image on a projection surface; an image capturing unit that captures the projected pattern image; and a corrector that corrects the captured image so that an imaging distortion caused due to image capturing and a projection distortion caused due to projection are corrected. The projection unit projects the corrected captured image at a predetermined position on the projection surface.

According to another embodiment, there is provided an image projection method that includes projecting a pattern image on a projection surface; capturing the projected pattern image; correcting the captured image so that an imaging distortion caused due to image capturing and a projection distortion caused due to projection are corrected; and projecting the corrected captured image at a predetermined position on the projection surface.

According to still another embodiment, there is provided a non-transitory computer-readable storage medium with an executable program stored thereon. The program instructs a computer to execute: projecting a pattern image on a projection surface; capturing the projected pattern image; correcting the captured image so that an imaging distortion caused due to image capturing and a projection distortion caused due to projection are corrected; and projecting the corrected captured image at a predetermined position on the projection surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. While an ultra short throw projector whose focal point distance is less than a width of a human person (more specifically, a width of a body of a human person) is taken as an example of an image projection apparatus, the present invention is not limited thereto.

Figure 1:
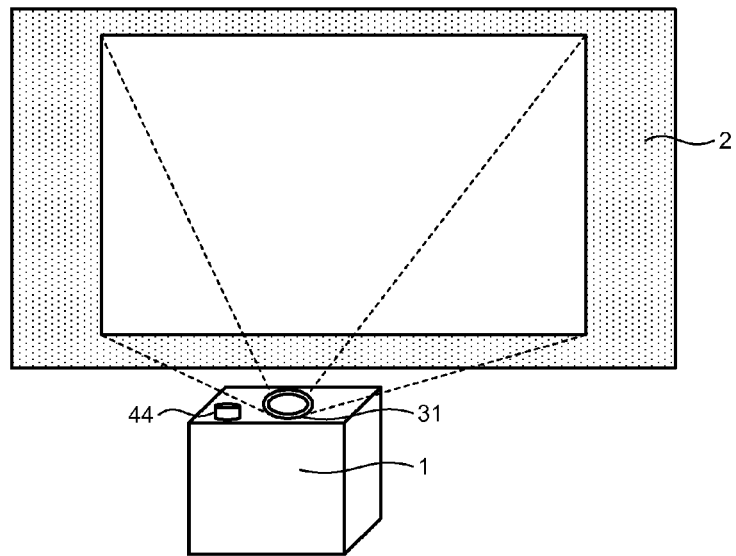
FIG. 1 is an explanatory view of an example of a brief overview of an ultra short throw projector according to an embodiment.

FIG. 1 is an explanatory view of an example of a brief overview of an ultra short throw projector 1 according to the embodiment. As illustrated in FIG. 1, a projection optical system 31 (an example of a projection unit) such as a projection lens is arranged on an upper surface of a chassis in the ultra short throw projector 1, and a light is radiated backward at an upper part from the projection optical system 31 to project an image onto a screen 2 as a projection surface.

While a focal point distance of the projection optical system 31 is configured to be less than a width of a body of a human person and shorter than a focal point distance of a projection optical system of a conventional projector, a size of an image to be projected by the projection optical system 31 is configured to be equivalent to a size of an image to be projected by the conventional projector. The projection optical system 31 that realizes such an ultra short throw as explained is disclosed in Japanese Laid-open Patent Publication No. 2007-316674, for example.

In the ultra short throw projector 1, a camera unit 44 (an example of an image capturing unit) is also arranged on the upper surface of the chassis.

Figure 2:
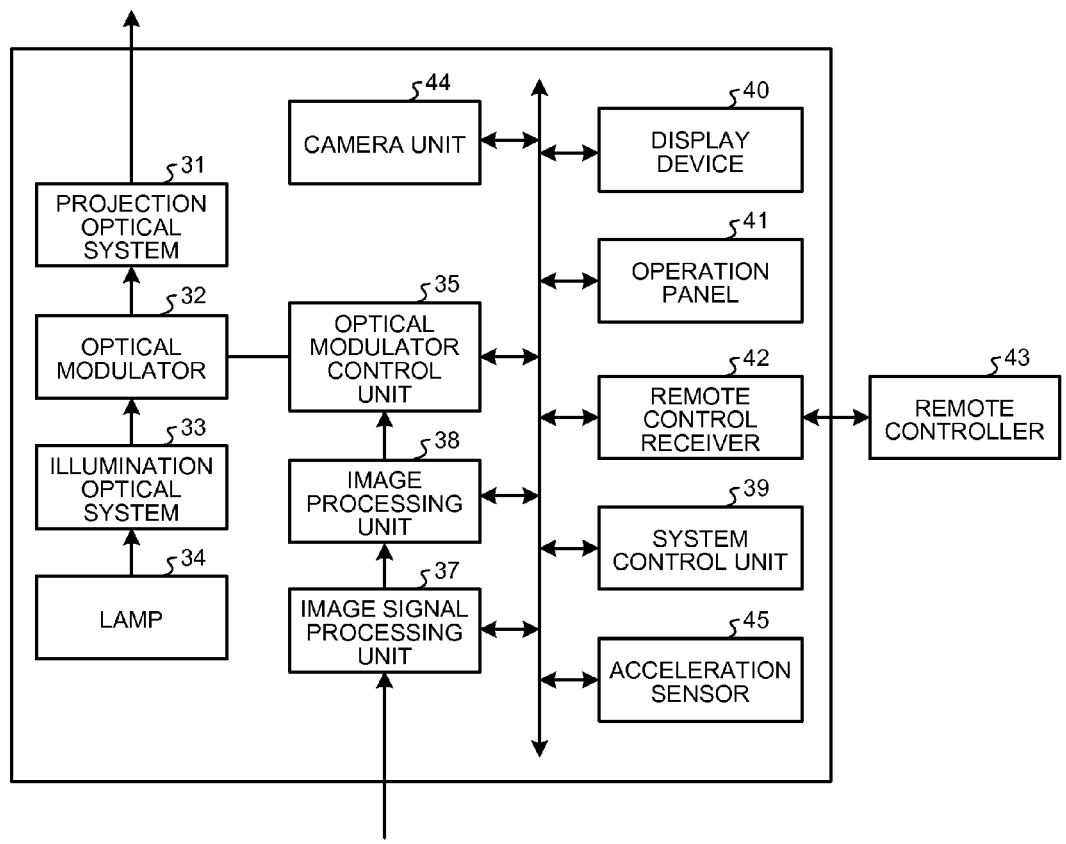
FIG. 2 is a block diagram of an example of a hardware configuration of the ultra short throw projector according to the embodiment.

FIG. 2 is a block diagram of an example of a hardware configuration of the ultra short throw projector 1 according to the embodiment. As illustrated in FIG. 2, the ultra short throw projector 1 is provided with the projection optical system 31, an optical modulator 32, an illumination optical system 33, a lamp 34, an optical modulator control unit 35, an image signal processing unit 37, an image processing unit 38, a system control unit 39, a display device 40, an operation panel 41, a remote control receiver 42, a remote controller 43, the camera unit 44, and an acceleration sensor 45 (an example of a detector).

The image signal processing unit 37 processes an image signal input via a not-illustrated external interface.

The image processing unit 38 performs processing of various kinds on a projection image which is an image signal processed by the image signal processing unit 37, a pattern image generated by the image processing unit 38, and a captured image captured by the camera unit 44. The pattern image is an image including a predetermined pattern. Details of the image processing unit 38 will be explained later.

The optical modulator control unit 35 causes the optical modulator 32 to display the image on which processing of various kinds is performed by the image processing unit 38.

The lamp 34, which will do as far as it radiates a light, functions as an optical source.

The illumination optical system 33, which condenses a light radiated from the lamp 34 onto the optical modulator 32, can be realized by a lens and a mirror, for example.

The optical modulator 32, which displays an image transmitted from the optical modulator control unit 35 and reflects or transmits the light condensed by the illumination optical system 33, can be realized by a digital mirror device (DMD), a liquid crystal panel, and the like.

The projection optical system 31, which projects an image on the screen 2 by projecting the light reflected or transmitted by the optical modulator 32 on the screen 2, can be realized by a lens and a mirror, for example.

The system control unit 39, which controls components of the ultra short throw projector 1, can be realized by a processing device including a central processing unit (CPU), a random access memory (RAM), a read only memory (ROM), and the like. The system control unit 39 receives a notification from the operation panel 41 and the remote control receiver 42 to perform a process in accordance with the notification.

The display device 40, which displays (announces) a state of the ultra short throw projector 1, can be realized by a light emitting diode (LED), for example. When the system control unit 39 detects an occurrence of an error and the like, for example, the display device 40 receives a notification from the system control unit 39 and displays the effect (turns on and off or lights the LED, for example).

The operation panel 41, which notifies the system control unit 39 of various kinds of operational inputs by a user, can be realized by a touch screen, for example.

The remote controller 43 notifies the remote control receiver 42 of various kinds of operational inputs by a user. The remote control receiver 42 notifies the system control unit 39 of the various kinds of inputs notified by the remote controller 43.

The camera unit 44, which captures a pattern image which is projected on the screen 2 by the projection optical system 31, can be realized by a camera, for example.

The acceleration sensor 45, which detects acceleration, detects a movement of the position of the ultra short throw projector 1 by detecting a force acting on the ultra short throw projector 1.

Figure 3:
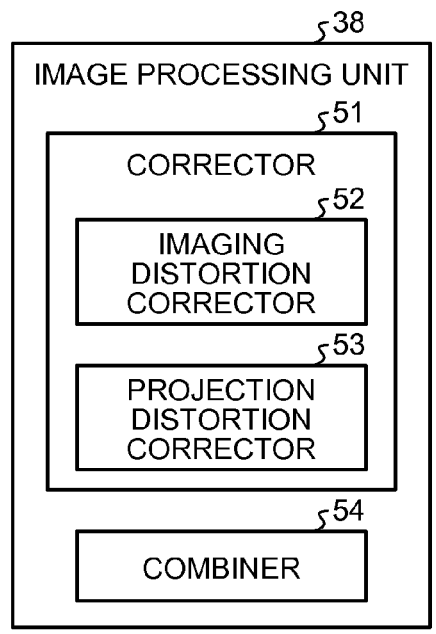
FIG. 3 is a block diagram of an example of a configuration of an image processing unit according to the embodiment.

FIG. 3 is a block diagram of an example of a configuration of the image processing unit 38 according to the embodiment. As illustrated in FIG. 3, the image processing unit 38 includes a corrector 51 and a combiner 54.

The corrector 51, which corrects a captured image captured by the camera unit 44 so that an imaging distortion caused due to image capturing and a projection distortion caused due to projection are corrected, includes an imaging distortion corrector 52 and a projection distortion corrector 53.

The imaging distortion corrector 52 corrects an imaging distortion of the captured image captured by the camera unit 44.

The projection distortion corrector 53 corrects a projection distortion of the captured image whose imaging distortion has been corrected by the imaging distortion corrector 52.

Here, the projection distortion corrector 53 may correct the projection distortion of the captured image captured by the camera unit 44 and the imaging distortion corrector 52 may correct the imaging distortion of the captured image whose projection distortion has been corrected by the projection distortion corrector 53.

The combiner 54 generates a composite image by combining the pattern image generated by the image processing unit 38 and the captured image corrected by the corrector 51. For example, the combiner 54 generates the composite image so that the corrected captured image is combined at a center of a lower part of the pattern image.

Figure 4:
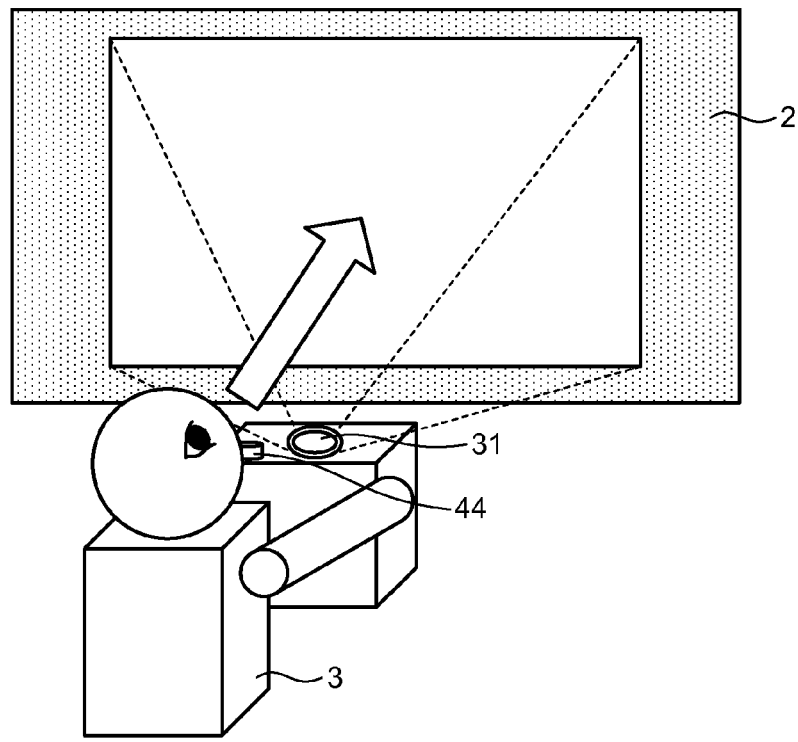
FIG. 4 is an explanatory view of an example of an installation situation of the ultra short throw projector according to the embodiment.

FIG. 4 is an explanatory view of an example of an installation situation of the ultra short throw projector 1 according to the embodiment. As explained above, since a light is radiated backward at an upper part from the projection optical system 31 to project an image on the screen 2 in the ultra short throw projector 1 according to the embodiment, a user 3 who arranges the ultra short throw projector 1 adjusts a position and an inclination of the ultra short throw projector 1 while looking up at the projected image from below.

Here, when an image is projected directly on the screen 2 like the conventional technique, the image is seen by the user 3 as a distorted image of a trapezoidal shape in which an upper side becomes narrower (hereinafter this distortion being sometimes referred to as "distortion attributed to the direction of the line of sight"). It therefore becomes difficult for the user 3 to determine whether or not the distortion caused by the misalignment of the inclination angle between the ultra short throw projector 1 and the screen 2 (hereinafter this distortion being sometimes referred to as "distortion attributed to the misalignment of the inclination angle") is resolved while adjusting the position and the inclination of the ultra short throw projector 1.

So, the ultra short throw projector 1 according to the embodiment projects, on the screen 2, an image whose distortion attributed to the direction of the line of sight of the user 3 is suppressed. Since the user 3 is thus able to see the image whose distortion attributed to the direction of the line of sight is suppressed, it becomes possible for the user 3 to determine whether or not the distortion attributed to the misalignment of the inclination angle is resolved while adjusting the position and the inclination of the ultra short throw projector 1.

Figure 5:
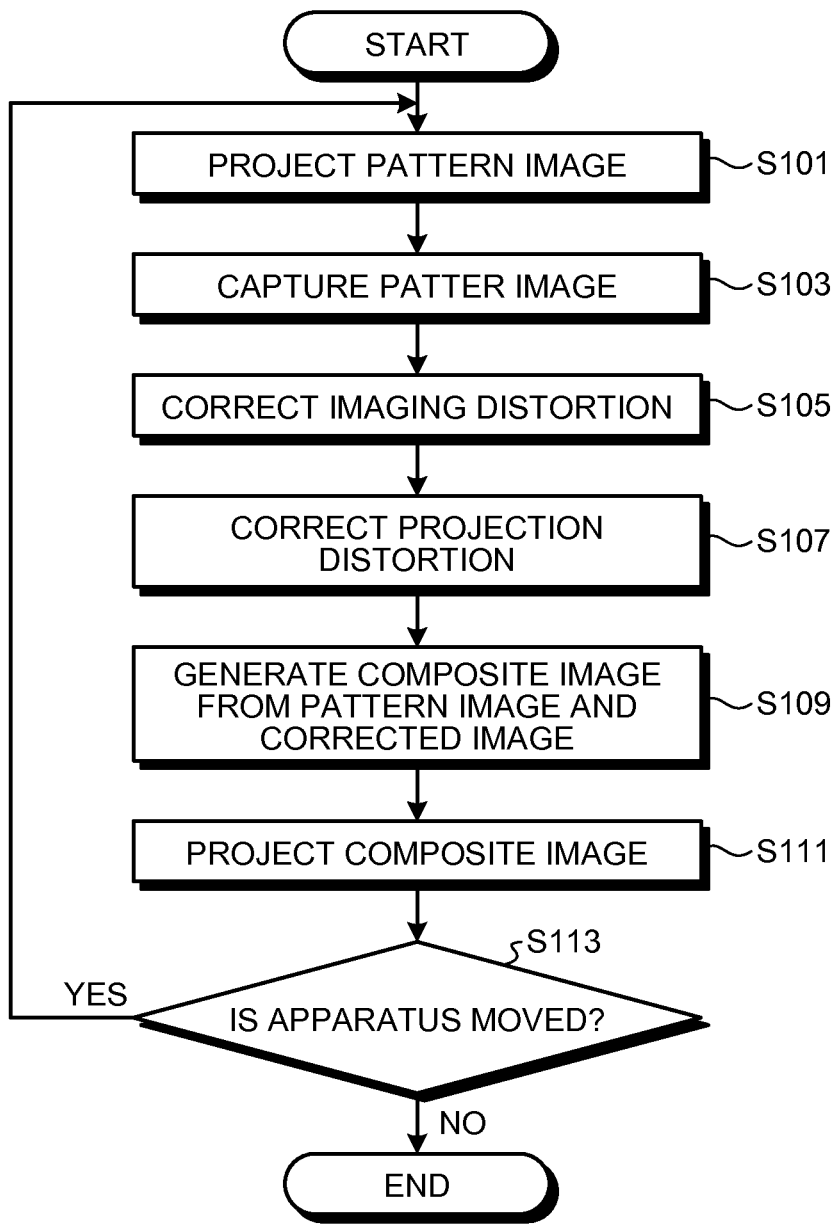
FIG. 5 is a sequence diagram of an example of a processing to be executed in the ultra short throw projector according to the embodiment.

FIG. 5 is a sequence diagram of an example of a processing to be executed in the ultra short throw projector 1 according to the embodiment.

Figure 6:
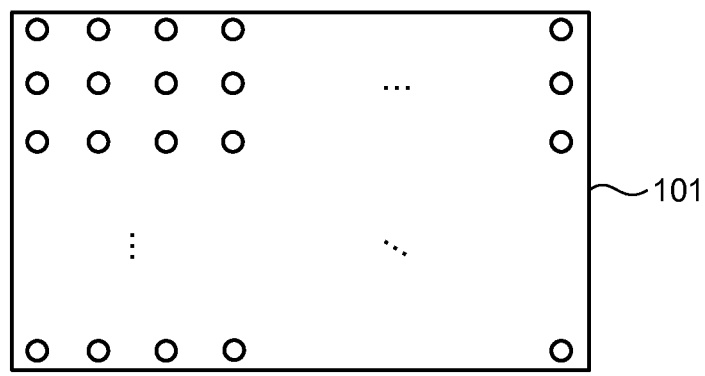
FIG. 6 illustrates an example of a pattern image before projection according to the embodiment.
Figure 7:
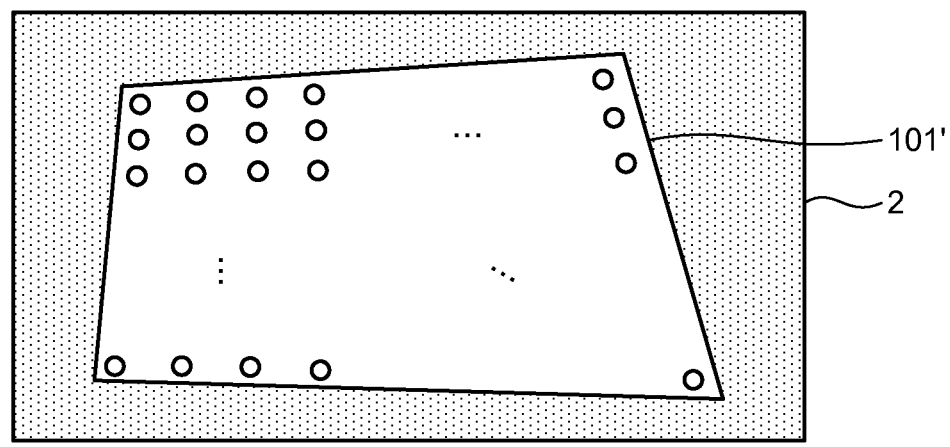
FIG. 7 illustrates an example of a pattern image after projection according to the embodiment.

First, the projection optical system 31 projects a pattern image on the screen 2 (step S101). FIG. 6 illustrates an example of a pattern image 101 before projection according to the embodiment and FIG. 7 illustrates an example of a pattern image 101' after projection according to the embodiment. While a plurality of feature points are arranged at regular intervals in a grid pattern in the pattern image 101 in the example illustrated in FIG. 6, the present invention is not limited thereto. In the example illustrated in FIG. 7, the distortion attributed to the misalignment of the inclination angle, i.e., the projection distortion associated with the projection is generated in the pattern image 101' projected on the screen 2.

Figure 8:
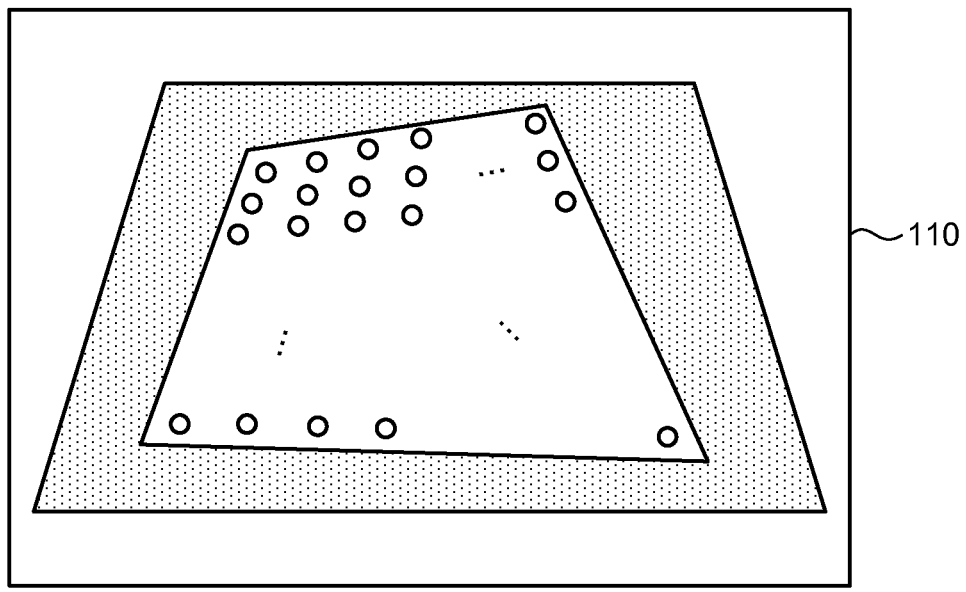
FIG. 8 illustrates an example of a captured image according to the embodiment.

The camera unit 44 then captures the pattern image 101' projected on the screen 2 (step S103). FIG. 8 illustrates an example of a captured image 110 according to the embodiment. As explained above, since the camera unit 44 is arranged on the upper surface of the chassis of the ultra short throw projector 1 in the embodiment, the imaging direction of the camera unit 44 becomes equivalent to the direction of the line of the sight of the user 3. Therefore, the captured image 110 captured by the camera unit 44 includes the distortion attributed to the direction of the line of the sight, i.e., the imaging distortion associated with imaging. That is to say, the projection distortion and the imaging distortion arise in the captured image 110.

Figure 9:
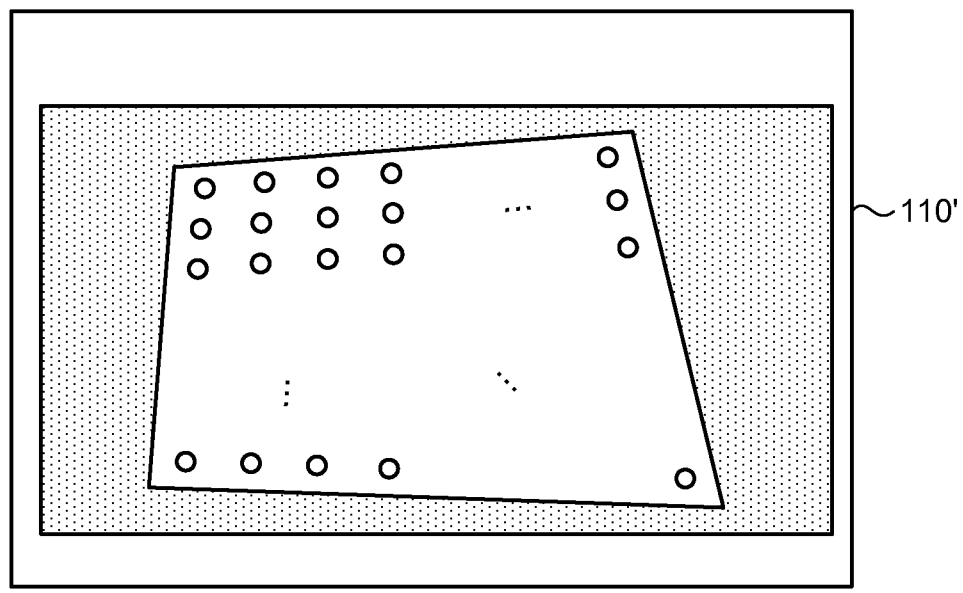
FIG. 9 illustrates an example of a captured image after correcting an imaging distortion according to the embodiment.

The imaging distortion corrector 52 then corrects the imaging distortion of the captured image 110 captured by the camera unit 44 (step S105). Specifically, the imaging distortion corrector 52 performs a correction into an image for a case where the captured image 110 is assumed to be captured from an imaging direction perpendicular to the plane of the pattern image 101' projected on the screen 2. FIG. 9 illustrates an example of a captured image 110' after correcting an imaging distortion according to the embodiment. Since the captured image 110' illustrated in FIG. 9 is an image for the case of being assumed to be captured from the imaging direction perpendicular to the plane of the pattern image 101' and the imaging distortion is corrected, the distortion in the pattern image 101' is equivalent to that illustrated in FIG. 7.

Figure 10:
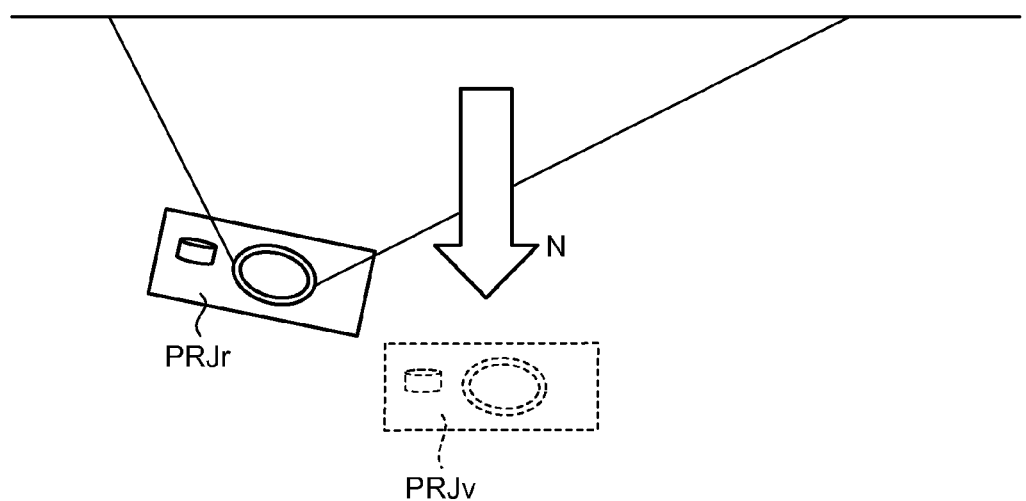
FIG. 10 is an explanatory view of an example of a method of correcting an imaging distortion according to the embodiment.

The technique for correcting an imaging distortion is disclosed in Japanese Laid-open Patent Publication No. 2013-42411, for example. Japanese Laid-open Patent Publication No. 2013-42411 discloses such a technique that an actual projector PRJr projects a pattern image, captures the pattern image by a camera equipped in the projector PRJr, and calculates virtual image data on the assumption that the pattern image is captured from a virtual projector PRJv which is assumed to be arranged on an extension of a normal line direction N of the screen by using the captured image and a perspective transformation matrix, as illustrated in FIG. 10.

The projection distortion corrector 53 then corrects the projection distortion of the captured image 110' whose imaging distortion has been corrected by the imaging distortion corrector 52 (step S107). The pattern image 101' in the captured image whose projection distortion is corrected is thus equivalent to that illustrated in FIG. 6.

The technique for correcting a projection distortion is disclosed in Japanese Laid-open Patent Publication No. 2001-83949, for example. Japanese Laid-open Patent Publication No. 2001-83949 discloses a technique of projecting a pattern image, capturing the projected pattern image, generating correction data for providing the captured image with a distortion opposite to the projection distortion, and correcting, by the correction data in advance, a projection distortion to be generated in the projection image.

The combiner 54 then generates a composite image by combining the pattern image generated by the image processing unit 38 and a corrected image as the captured image corrected by the corrector 51 (step S109).

Figure 11:
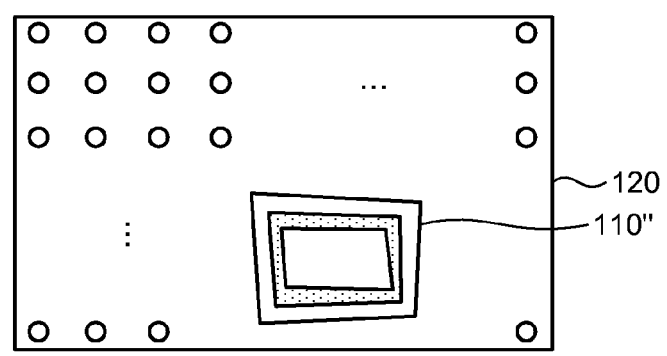
FIG. 11 illustrates an example of a composite image according to the embodiment.

FIG. 11 illustrates an example of a composite image 120 according to the embodiment. In the composite image 120 illustrated in FIG. 11, a corrected image 110" as the captured image whose projection distortion and imaging distortion are corrected is compounded at the center of the lower part of the pattern image 101.

Since the combiner 54 reduces and compounds the corrected image 110" at the center of the lower part of the pattern image 101 in the example illustrated in FIG. 11, the projection distortion corrector 53 corrects a projection distortion of an entirety of the captured image 110' whose imaging distortion has been corrected. Here, as far as the combiner 54 compounds a part of the corrected image 110" at the center of the lower part of the pattern image 101, it is only necessary for the projection distortion corrector 53 to correct a projection distortion of the corresponding part.

The projection optical system 31 then projects the composite image generated by the combiner 54 so that the corrected image 110" locates at a predetermined position of the screen 2 (step S111). While the predetermined position is configured to be the center of the lower part of the screen 2 in the embodiment since the user 3 adjusts the position and the inclination of the ultra short throw projector 1 while looking up at the projected image from below, the present invention is not limited thereto. Here, since the combiner 54 combines the corrected image 110" at the center of the lower part of the pattern image 101, the corrected image 110" locates at the center of the lower part of the screen 2 when the projection optical system 31 projects the composite image directly.

Figure 12:
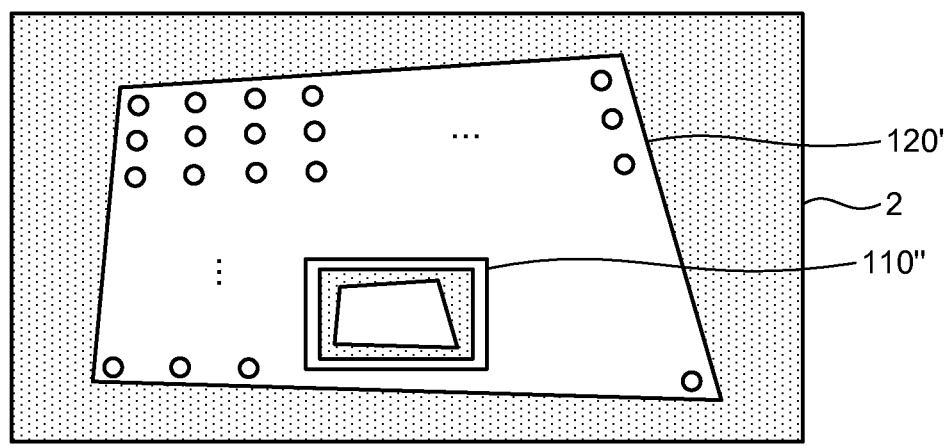
FIG. 12 illustrates an example of a composite image after projection according to the embodiment.

FIG. 12 illustrates an example of a composite image 120' after projection according to the embodiment. Since locating at the center of the lower part of the screen 2 in the example illustrated in FIG. 12, the corrected image 110" included in the composite image 120' is approximately perpendicular to the line of the sight of the user 3, which allows suppressing the distortion attributed to the direction of the line of the sight. Though a projection distortion arises in the pattern image within the corrected image 110" in the example illustrated in FIG. 12, the ultra short throw projector 1 is adjusted to the position and the inclination at which no misalignment of the inclination angle between the ultra short throw projector 1 and the screen 2 arises as far as there is no projection distortion in the pattern image within the corrected image 110".

The acceleration sensor 45 then detects whether or not the position of the ultra short throw projector 1 is moved (step S113). Specifically, the system control unit 39 regularly obtains measurement values of the acceleration from the acceleration sensor 45, checks a change in the obtained measurement values, and then detects whether or not the position of the ultra short throw projector 1 is moved. When a force for moving the position of the ultra short throw projector 1 is applied to the ultra short throw projector 1, a measurement value of the acceleration becomes large and when a force is not applied to the ultra short throw projector 1, a measurement value of the acceleration becomes small.

When the acceleration sensor 45 detects the movement of the position of the ultra short throw projector 1 ("Yes" at step S113), the processing returns to step S101, the projection optical system 31 projects the pattern image again (step S101), and the camera unit 44 captures the pattern image 101' again projected on the screen 2 (step S103). This is because the inclination angle with the screen 2 changes and the distortion attributed to the misalignment of the inclination angle also changes when the position of the ultra short throw projector 1 is moved.

On the other hand, when the acceleration sensor 45 does not detect the movement of the position of the ultra short throw projector 1 ("No" at step S113), the processing ends.

As explained so far, the composite image 120' is projected on the screen 2 in a manner of suppressing the distortion attributed to the direction of the line of the sight of the user 3 in the embodiment. In other words, the composite image 120' is equivalent to the pattern image 101' seen from a position where the plane of the pattern image 101' projected on the screen 2 becomes perpendicular to the direction of the line of the sight of the user 3. Therefore, it is possible for the user 3 to determine whether or not the distortion attributed to the misalignment of the inclination angle is resolved by checking the projection distortion of the pattern image within the corrected image 110" included in the composite image 120' while adjusting the position and the inclination of the ultra short throw projector 1.

According to the embodiment, it is thus possible for the user 3 to make a positional adjustment, for resolving a distortion in a projection image, of the ultra short throw projector 1 without extra cost and efforts.

Since the composite image 120' is generated from the pattern image 101 and the corrected image 110" in the embodiment, an installation personnel checks the corrected image 110" and the others check the pattern image 101 in making a positional adjustment of the ultra short throw projector 1 by multiple persons, so that it is possible to accurately determine whether or not the distortion attributed to the misalignment of the inclination angle is resolved.

A program to be executed in the ultra short throw projector 1 according to the embodiment is provided by being stored in a file of an installable format or of an executable format in a computer-readable storage medium such as a CD-ROM, a CD-R, a memory card, a digital versatile disk (DVD), and a flexible disk (FD).

The program to be executed in the ultra short throw projector 1 according to the embodiment may be provided by being stored on a computer connected to a network such as the Internet and downloaded via the network. Besides, the program to be executed in the ultra short throw projector 1 according to the embodiment may be provided or distributed via a network such as the Internet. Moreover, the program to be executed in the ultra short throw projector 1 according to the embodiment may be provided by being preloaded in a ROM and the like.

The program to be executed in the ultra short throw projector 1 according to the embodiment has a module configuration that enables the above-described components to be realized on a computer. As an actual hardware, a CPU reads out from a ROM onto a RAM and executes the program, so that each component is realized on the computer.

Modification

While the corrected image 110" is combined at the center of the lower part of the pattern image 101 and projected in the embodiment, the corrected image 110" may be projected to locate at a center of a lower part of the screen 2. It is possible in this configuration, too to obtain the same advantage as the embodiment.

While the acceleration sensor 45 is taken as an example in the embodiment, the present invention is not limited thereto and a gyroscopic sensor, a ranging sensor that measures a distance to the screen, and the like may be used.

According to the embodiment, there is an advantage in that a positional adjustment, for resolving a distortion in a projection image, of an image projection apparatus can be made without extra cost and efforts.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising
a projection unit to project a pattern image on a projection surface;
an image capturing unit to capture the projected pattern image;
a corrector to correct the captured image so that an imaging distortion, caused due to image capturing, and a projection distortion, caused due to projection, are corrected; and
a combiner to generate a composite image by combining the pattern image and the corrected captured image,
wherein the projection unit is further configured to project the corrected captured image at a position on the projection surface and is further configured to project the composite image so that the corrected captured image locates at the position, and
wherein the position is a center of a lower part of the projection surface, and the combiner is further configured to generate the composite image in which the corrected captured image is combined at the center of the lower part of the pattern image.

2. The image projection apparatus of claim 1, further comprising:
a detector to detect a movement of a position of the image projection apparatus, wherein
the projection unit is further configured to project the pattern image again when the movement of the position is detected, and
the image capturing unit is further configured to capture the pattern image projected again.

3. The image projection apparatus of claim 1,
wherein the corrector includes an imaging distortion corrector to correct the imaging distortion of the captured image and a projection distortion corrector to correct the projection distortion of the captured image whose imaging distortion has been corrected.

4. The image projection apparatus of claim 1, wherein a focal point distance of the image projection apparatus is less than a width of a human person.

5. A non-transitory computer-readable storage medium with an executable program stored thereon, wherein the program instructs a computer to execute:
projecting a pattern image on a projection surface;
capturing the projected pattern image;
correcting the captured image so that an imaging distortion caused due to image capturing and a projection distortion caused due to projection are corrected;
generating a composite image by combining the pattern image and the corrected captured image; and
projecting the corrected captured image at a position on the projection surface, the position being a center of a lower part of the projection surface and the composite image being projected such that the corrected captured image locates at the position,
wherein the generating of the composite image includes combining the corrected captured image at the center of the lower part of the pattern image.

6. The non-transitory computer-readable storage medium of claim 5, wherein the program further instructs the computer to execute at least the following:
detecting a movement of a position of the image projection apparatus, wherein
projecting the pattern image again when the movement of the position is detected, and
capturing the pattern image projected again.

7. The non-transitory computer-readable storage medium of claim 5, wherein the correcting includes correcting the imaging distortion of the captured image and correcting the projection distortion of the captured image whose imaging distortion has been corrected.

8. The non-transitory computer-readable storage medium of claim 5, wherein a focal point distance of the image projection apparatus is less than a width of a human person.

9. An image projection method comprising:
projecting a pattern image on a projection surface;
capturing the projected pattern image;
correcting the captured image so that an imaging distortion caused due to image capturing and a projection distortion caused due to projection are corrected;
generating a composite image by combining the pattern image and the corrected captured image; and
projecting the corrected captured image at a position on the projection surface, the position being a center of a lower part of the projection surface and the composite image being projected such that the corrected captured image locates at the position,
wherein the generating of the composite image includes combining the corrected captured image at the center of the lower part of the pattern image.

10. The image projection method of claim 9, further comprising:
detecting a movement of a position of the image projection apparatus, wherein
projecting the pattern image again when the movement of the position is detected, and
capturing the pattern image projected again.

11. The image projection method of claim 9, wherein the correcting includes correcting the imaging distortion of the captured image and correcting the projection distortion of the captured image whose imaging distortion has been corrected.

12. The image projection method of claim 9, wherein a focal point distance of the image projection apparatus is less than a width of a human person.

* * * * *